Patented June 14, 1932

1,863,157

UNITED STATES PATENT OFFICE

ERNEST WALTER GEERE, OF BECKENHAM, ENGLAND

TREATMENT OF CHEMICAL SUBSTANCES TO PREVENT THEIR DETERIORATION OR INTERACTION WITH OTHER BODIES

No Drawing. Application filed December 21, 1926, Serial No. 156,257, and in Great Britain August 21, 1926.

This my invention relates to the treatment of chemical substances such as acid phosphates, acid sulphates, tartaric and citric acids and their acid salts, carbonates, and any admixture of these, by incorporating them with a medium, such as oils, fats or waxes of varying softening and melting points. The objects of this my invention are to restrict to a predetermined time the chemical action between any such substances and other bodies, to prevent any deterioration of such chemical substances and to overcome their hygroscopic character, by the control of the softening and melting point of the medium used.

In practical tests I have proved that these objects are obtained to a marked degree by the selection of media of suitable softening and melting points, for example, in the case of dihydrogen sodium phosphate ($H_2NaPO_4$), I find by this treatment the hygroscopic character of this salt is overcome. When treated with a medium having a melting point of 50° C. and a given quantity is mixed with the requisite amount of sodium bicarbonate and water, at ordinary temperatures of 15-20° C. the reaction is retarded to such an extent as to be negligible; on increasing the temperature to the softening point of 25-30° C. of the medium, the reaction commences, and as the temperature is raised to the melting point, so the reaction is developed to the maximum. By increasing the melting point of the medium, the action can be still further retarded, and its speed governed by the softening and melting points.

This invention consists of combining oils, fats or waxes of selected melting points, with acid phosphates, acid sulphates, tartaric and citric acids, and their acid salts, carbonates, and any admixture of these chemical substances, to the extent of from 5% to 20%, whereby the objects of this invention are achieved.

Such chemical substances can be treated with the desired medium during the later stages of manufacture, in the following known manners:—

(a) By the use of edge runner mills.

(b) By spraying the chemical substances which are being treated with a molten medium in a sifting chamber.

(c) By first melting the medium in a vessel heated to a temperature a few degrees above the melting point of the medium used, and stirring in the chemical substance which is being treated, until a homogeneous mixture is secured.

I claim:—

The process of producing carbon dioxide, consisting in bringing acid substances, in crystalline form and admixed with and enveloped by a moisture resisting medium having a low melting point, in contact with a carbonate, whereby the chemical reaction between said acid substances and said carbonate is controllable by the temperature to which said acids and said carbonate are subjected.

ERNEST WALTER GEERE.